United States Patent

[11] 3,582,722

| [72] | Inventor | Raymond Neil Dalton<br>Boyertown |
|---|---|---|
| [21] | Appl. No. | 845,791 |
| [22] | Filed | July 29, 1969 |
| [45] | Patented | June 1, 1971 |
| [73] | Assignee | Kawecki Berylco Industries, Inc.<br>New York, |

[54] EXPLOSION-PROOF ELECTROLYTIC CAPACITOR
2 Claims, 3 Drawing Figs.

[52] U.S. Cl. .................................................. 317/230, 317/242
[51] Int. Cl. .................................................. H01g 9/06
[50] Field of Search .................................................. 317/230, 231, 232, 233, 242

[56] References Cited
UNITED STATES PATENTS

| 1,758,947 | 5/1930 | Hammond | 317/233 |
| 1,769,837 | 7/1930 | Hill | 317/233 |
| 2,213,209 | 9/1940 | De Lange et al. | 317/230 |
| 2,881,368 | 4/1959 | Hancock | 317/230 |
| 3,323,026 | 5/1967 | Minami et al. | 317/230 |
| 3,331,002 | 7/1967 | Everitt | 317/230 |

Primary Examiner—James D. Kallam
Attorney—Pennie, Edmonds, Morton, Taylor and Adams ABSTRACT: An electrolytic capacitor comprising an outer metal case within which a porous anode and a liquid electrolyte are hermetically sealed is made explosion proof by providing it with a self-shorting contact arm secured to one point on the inner surface of the case and at least partially surrounding, but one of contact with, the anode so that pressure generated within the case sufficient to cause bulging of the case will bring the case-carrying contact arm into electrical contact with the anode.

PATENTED JUN 1 1971  3,582,722

INVENTOR
Raymond Neil Dalton
BY
ATTORNEYS

EXPLOSION-PROOF ELECTROLYTIC CAPACITOR

This invention relates to electrolytic capacitors and, more particularly, to an electrolytic capacitor which will not explode due to internally generated gas pressure.

Electrolytic capacitors consist essentially of an outer metal case within which a porous metal anode and a liquid electrolyte are hermetically sealed. The anode is mounted in spaced relation to the case so that it is out of direct contact with the case. Electrical failure of such a capacitor is evidenced by a high direct current leakage between the anode and the case. This leakage causes electrolysis of the electrolyte and generates a gas which will ultimately build up to a pressure sufficient to cause an explosion by rupture of the case.

I have now devised an electrolytic capacitor which is virtually explosion-proof. To achieve this result, I provide such a hermetically sealed capacitor with an internal contact arm secured to a single localized area on the inside of the case and at least partially encircling the anode to a position diametrically opposite its area of contact with the case but completely spaced from and out of contact with the surface of the anode. The spacing between the contact arm and the anode at the aforesaid diametrically opposite position is such that any significant bulging of the case will cause the contact arm to engage the anode and short circuit the capacitor.

These and other novel features of the improved electrolytic capacitor of my invention will be readily understood from the following description taken in conjunction with the accompanying drawings in which.

Figure 1:
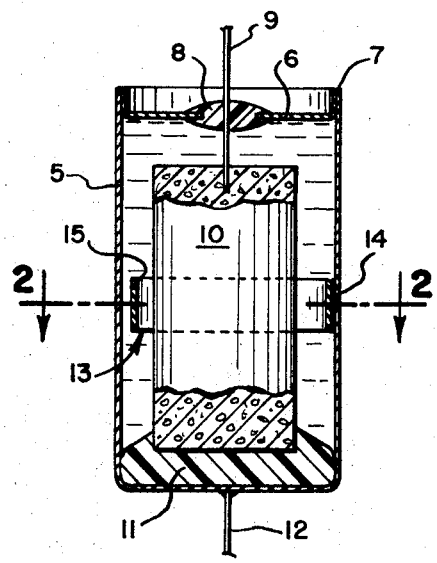
FIG. 1 is a sectional side elevation of an electrolytic capacitor embodying the invention.
Figure 2:
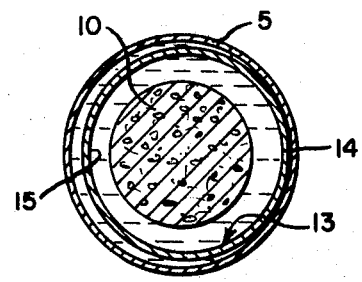
FIG. 2 is a section taken along line 2-2 in FIG. 1.
Figure 3:
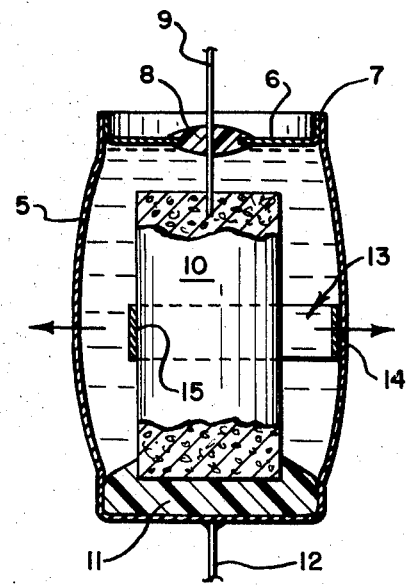
FIG. 3 is a sectional side elevation of the capacitor of FIG. 1 in bulged condition.

As shown in FIG. 1, the capacitor is typical of an electrolytic device comprising a metal case 5 in the shape of a can with its open mouth closed by a metallic end member 6 hermetically sealed to the case around its periphery 7. The center of the end member is provided with a button 8 of insulating and sealing material through which an anode lead wire 9 projects into the interior of the case. A porous metal anode 10 is mounted on the inner portion of the lead wire 9 and is further held in position at its innermost end by a plastic support 11. The interior of the case is filled with an electrolyte which permeates the porous anode. A case lead 12 is connected to the outside of the base of the case in order to complete the electrical connections for the capacitor.

Pursuant to the invention, a metallic contact arm 13 is secured, by spot welding, brazing, soldering, riveting, or the like, to a single localized area 14 on the inner surface of the case 5. The contact arm can be in the form of a ring or of a half-ring or the like, but must at least partially encircle the anode to a position marked 15 diametrically opposite the point or area of attachment of the contact arm to the case. The contact arm is completely spaced from and out of contact with the surface of the anode in its installed condition. The spacing between the contact arm and the anode at the position marked 15 is such that any significant bulging of the case, due to the build up of gas pressure within the case during incipient failure of the capacitor, will cause displacement of the contact arm toward and ultimately into contact with the anode. When this contact is made, the capacitor will be internally short-circuited and will blow a fuse or any other protective device in the electrical circuit of which it is a component. Thus, the generation of gas by electrolysis in the failing capacitor will automatically terminate this generation by the bulging of the capacitor case 5 before the pressure within the case exceeds the burst strength of the case.

I claim:

1. In an electric capacitor having a hermetically sealed outer metal case containing a liquid electrolyte and having a porous metal anode mounted in the electrolyte in spaced relation to the case, the improvement which comprises a metallic contact arm secured to a single localized area on the inner surface of the case and at least partially encircling the anode to a position diametrically opposite its area of contact with the case but completely spaced from and out of contact with the surface of the anode, the contact arm being displaceable into engagement with the anode at said diametrically opposite position upon significant bulging of the case whereby the arm and anode short circuit the capacitor to terminate generation of gas pressure within the case.

2. An electric capacitor according to claim 1 in which the contact arm comprises a substantially circular ring encircling the anode.